United States Patent [19]

Kohzai

[11] 3,961,363

[45] June 1, 1976

[54] COLOUR PICKUP TUBES

[75] Inventor: Hayao Kohzai, Mobara, Japan

[73] Assignee: Hitachi, Ltd., Tokyo, Japan

[22] Filed: Sept. 17, 1974

[21] Appl. No.: 506,790

[30] Foreign Application Priority Data

Nov. 5, 1973 Japan .............................. 48-123421

[52] U.S. Cl. .................................. 358/43; 313/371

[51] Int. Cl.$^2$ ...................... H04N 9/07; H01J 31/26

[58] Field of Search .......................... 358/43, 44–47, 358/55; 313/365, 370–372, 384–386, 388–390

[56] References Cited

UNITED STATES PATENTS

| | | | |
|---|---|---|---|
| 3,225,240 | 12/1965 | Sybeldon | 313/390 |
| 3,735,032 | 5/1973 | Goetz | 358/44 |
| 3,751,133 | 8/1973 | Nishino | 358/55 |

*Primary Examiner*—Robert L. Griffin
*Assistant Examiner*—John C. Martin
*Attorney, Agent, or Firm*—Charles E. Pfund

[57] ABSTRACT

In a colour pickup tube for use in a single tube or two tube type colour television camera system wherein an optical colour analyzing stripe filter, a transparent film, a transparent electroconductive film and a photoconductor film are disposed in the order mentioned on the rear side of the transparent glass substrate of the tube, the thickness of the transparent film is increased gradually from the central portion toward the peripheral portion of the transparent film.

5 Claims, 4 Drawing Figures

COLOUR PICKUP TUBES

BACKGROUND OF THE INVENTION

This invention relates to a colour pickup tube for use in a single tube type or a two tube type colour television camera system, and more particularly to a colour pickup tube provided with a transparent film formed on the rear surface of an optical colour analyzing stripe filter.

In a colour pickup tube of the type referred to above, a frequency separating system or a phase separating system is generally utilized, but for the purpose of description, a colour pickup tube for a single tube type colour television camera system utilizing the frequency separating system will be considered herein. A colour pickup tube of this type comprises a transparent substrate on the forward end of the tube which confronts an object and an optical colour analyzing stripe filter deposited on the rear surface of the glass substrate for reflecting red and blue colour components contained in the incident light, as disclosed in the specification of U.S. Pat. No. 3,291,901. Within the envelope of the colour pickup tube are disposed a transparent electroconductor film, a photoconductor film and an electron gun to the rear of the optical colour analyzing stripe filter in the order mentioned. In a colour pickup tube of this construction, the red colour component of the incident light from an object is amplitude modulated by an optical colour analyzing stripe filter for reflecting red light whereas the blue colour component is amplitude modulated by an optical colour analyzing stripe filter for reflecting blue colour. These amplitude modulated signals are passed through bandpass filters and detectors to obtain blue and red signals. Since the brightness component is not modulated by the optical colour analyzing stripe filters it is possible to obtain the brightness signal by merely passing the outputs of the filters through a low pass filter.

To manufacture such a colour pickup tube it is difficult to form a transparent electroconductor film and a photoconductor film directly on the optical colour analyzing stripe filters for reflecting red and blue colours, which are deposited on the transparent glass substrate. More particularly, a Nesa (trade mark) film is usually used as the transparent electroconductor film but since the Nesa film comprises a film comprising essentially of tin oxide which is formed by spraying finely divided particles of a solution consisting essentially of stannic chloride on the transparent glass substrate preheated to about 500°C and then decomposing and oxidizing the stannic chloride, it is inevitable to heat the glass substrate to a temperature of about 500°C. For this reason, it is almost impossible to form the optical colour analyzing stripe filters for reflecting red and blue colours by utilizing organic materials of poor heat resistant property and evolving a large quantity of gas in vacuum. Where the optical colour analyzing stripe filters for reflecting red and blue colours are made of interference filters, irregularities are formed on the photoconductor film deposited on the interference filters corresponding to the surface irregularities thereof, thus rendering nonuniform the electric field of the photoconductor film. As a result, the signal current will become abnormal due to abnormal surface electric field which is caused by said surface irregularities. Further, impurities deposited on or contained in the irregularities or the delicate construction of the interference filters impairs the photoelectric converting characteristic of the photoconductor film whereby false image signals corresponding to said surface irregularities will be produced.

To solve this difficulty, it has been proposed to interpose between the colour analyzing stripe filter and the transparent electroconductor film a transparent film with a flat surface on the side thereof facing the transparent electroconductor film. Such a transparent film may be a thin glass film or an overcoating formed by vapour deposition or sputtering of transparent substance, and the thickness of the transparent film should be uniform and may range from 5 to 50 microns which is necessary not to make obscure the image of the colour analyzing stripe filter projected on the photoconductor film.

However, where a transparent film is formed on the transparent glass substrate on the fore end of the colour pickup tube, while the assembly is cleaned, the chemical of the detergent tends to permeate into the interface between the transparent film and the optical colour analyzing stripe filter. Such chemical or moisture permeated into the interface causes the transparent film to peel off. The thinner is the film, the larger is such tendency. Moreover, the light flux arriving at the optical colour analyzing stripe filter via an objective lens will have a large focusing angle at the central portion of the stripe filter whereas a small focusing angle on the peripheral portion thereof. For this reason, the image of the optical colour analyzing stripe filter projected on the photoconductor film will be severely obscured at the central portion, but not so severely on the peripheral portion.

SUMMARY OF THE INVENTION

It is an object of this invention to eliminate the mechanical defect, that is peeling off of the transparent film as well as the optical defect, that is the obscureness of the focused image by increasing the thickness of the transparent film at portions thereof where such increase in the thickness is permissible from the optical standpoint.

Another object of this invention is to provide an improved colour pickup tube of rugged construction and capable of eliminating the obscureness of the projected image of the optical colour analyzing stripe filter.

According to this invention these and other objects can be accomplished by providing a vidicon type colour pickup tube for use in a single tube or two tube type colour television camera system of the type comprising a glass envelope, a transparent glass substrate sealed to one end of the envelope, an optical colour analyzing stripe filter disposed on the rear surface of the glass substrate, a transparent film formed on the filter, a transparent electroconductor film formed on the transparent film, and a photoconductor film formed on the electroconductive film, characterized in that the thickness of the transparent film is increased gradually from the central portion toward the peripheral portion of the transparent film.

One surface of the transparent film is flat while the other surface is concave or spherical. Such transparent film may be obtained by grinding one surface with a grinding tool having a convex grinding surface or by vapour depositing or spattering a transparent substance through a mask having an appropriate configuration.

BRIEF DESCRIPTION OF THE DRAWING

Further objects and advantages of the invention will be more fully understood from the following detailed description taken,in conjunction with the accompanying drawing in which.

DESCRIPTION OF THE PREFERRED EMBODIMENT

Figure 1:
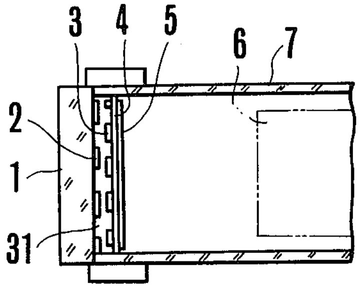
FIG. 1 PRIOR ART
FIG. 1 is a diagrammatic longitudinal sectional view of a prior art colour pickup tube not provided with a transparent film.

A prior art colour pickup tube shown in FIG. 1 comprises a transparent glass substrate or window 1 which is sealed to the front end of a glass envelope 7, an electron gun assembly 6 contained in the envelope 7, an optical colour analyzing stripe filter 2 for reflecting red light, an optical colour analyzing stripe filter 3 for reflecting blue light, a transparent electroconductor film 4 and a photoconductor film 5 which are disposed in the order mentioned to the rear of the transparent glass substrate 1. In another prior art colour pickup tube shown in FIG. 2, in addition to the various component elements described above, there is provided a transparent film 8 between the optical colour analyzing stripe filters 2 and 3 and the transparent electroconductor film 4, the surface of the transparent film 8 facing the transparent film 4 being flat.

Figure 2:
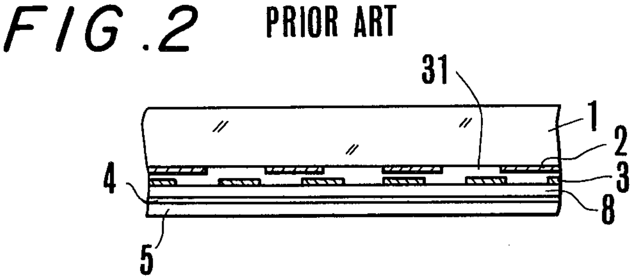
FIG. 2 PRIOR ART
FIG. 2 is an enlarged sectional view of the transparent glass substrate of a prior art colour pickup tube provided with a transparent film.

In FIGS. 1 and 2, numeral 31 designates a transparent binder.

Figure 3:
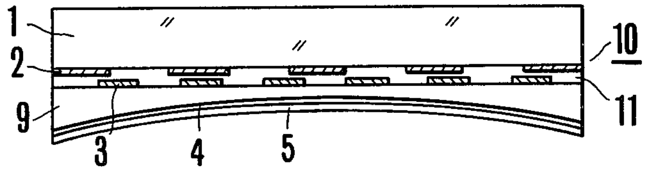
FIG. 3 shows an enlarged sectional view of a portion of one example of the colour pickup tube embodying the invention.

FIG. 3 shows one embodiment of this invention which is an improvement of the prior art colour pickup tube shown in FIG. 2. In this embodiment also optical colour analyzing stripe filters 2 and 3 for reflecting red colour and blue colour respectively are formed in a close proximity to the rear surface of the transparent glass substrate 1, but according to this invention a transparent film 9 is provided to support the filter 3 and the thickness of the film 9 at the central portion of the film 9 where the focusing angle is large is made thin, substantially equal to that of the transparent film 8 utilized in the prior art construction, whereas the thickness of the peripheral portion where the focusing angle is small is increased substantially. Such concave surface of the film 9 can be formed by using a grinding tool as will be described later. In one example, best optical and mechanical characteristics were obtained when the minimum thickness at the central portion was selected to be from 30 to 50 microns and the maximum thickness of the peripheral portion to be from 60 to 80 microns. It is advantageous to make flat one surface of the transparent film 9 and to make spherical the other surface. Although the radius of curvature of the curved surface is different depending upon the characteristic of the colour pickup tube, it is essential to select the radius of curvature so as to compensate for the difference between the focusing angles at the central portion and the peripheral portion. Although not shown in the drawing, it should be understood that the transparent conductor film 4 and the photoconductor film 5 are deposited on the curved surface of the film 9 in the same manner as has been described in connection with FIGS. 1 and 2. The face plate 10 constructed as described hereinabove is sealed to the front end of glass envelope 7 (see FIG. 1) thus completing a colour pickup tube.

Figure 4:
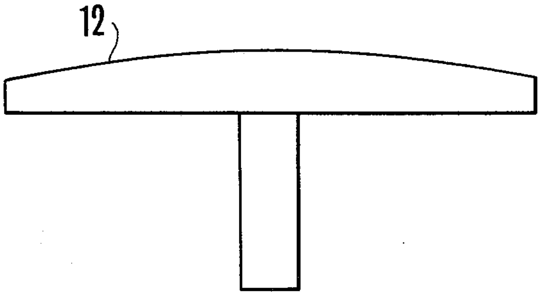
FIG. 4 is a side view of a grinding tool utilized to manufacture the colour pickup tube of this invention.

A method of manufacturing the face plate 10 is as follows:

The optical colour analyzing stripe filter 2 for reflecting red colour is vapour deposited on one surface of the transparent glass substrate 1 and the optical colour analyzing stripe filter 3 for reflecting blue colour is vapour deposited on the flat surface of the transparent film 9 made of glass for example. The substrate 1 and the transparent film 9 are bonded together by means of a biner 11 having a thickness of 5 to 7 microns, for example, with the filters 2 and 3 faced with each other. The opposite surface of the transparent film 9 is ground by means of a convex grinding tool 12 as shown in FIG. 4 to form the curved or spherical surface. Of course the grinding operation is continued until thicknesses at various portions of the film are reduced to the desired values and until the curvature of the curved surface becomes equal to that of the grinding tool 12.

Alternatively, the optical colour analyzing stripe filters 2 and 3 for reflecting red and blue colours, respectively, may be formed on one surface of the transparent glass substrate 1 and then a transparent substance, silicon oxide for example, may be applied onto the filters by spattering or vapour deposition technique to form the transparent film 9. In this case it is possible to form the transparent film 9 of any desired shape and thickness by using a mask having an appropriate configuration.

Although the invention has been shown and described in terms of a frequency separating type colour pickup tube for use in a colour television camera system of the single tube type, it will be clear that the invention is not limited to this type and that the invention is also applicable to a phase separating type colour pickup tube for use in a two tube type colour television camera system.

As has been described hereinabove, since according to this invention there is provided a transparent film whose thickness is the minimum at the central portion and gradually increases toward the periphery it is possible to provide an improved colour pickup tube having a face plate of rugged construction which cannot only prevent the adverse effect of the light flux but also improve the resistances against chemicals and moisture.

What is claimed is:

1. In a vidicon type colour pickup tube for use in a colour television camera system of the type comprising a glass envelope, a transparent glass substrate sealed to one end of said envelope, an optical colour analyzing stripe filter disposed on the rear surface of said glass substrate, a transparent film formed on said filter, a transparent electroconductor film formed on said transparent film and a photoconductor film formed on said electroconductor film, the improvement wherein the thickness of said transparent film is increased gradually from the central portion toward the peripheral portion of said transparent film.

2. The colour pickup tube according to claim 1 wherein one surface of said transparent film is flat and the other surface is concave.

3. The colour pickup tube according to claim 2 wherein said concave surface comprises a ground concave surface contour on one surface of a transparent glass sheet.

4. The colour pickup tube according to claim 1 wherein said transparent film is a vapor deposited transparent substance and one surface of said transparent film is concave.

5. The color pickup tube according to claim 1 wherein said transparent film comprises a spattered transparent substance and one surface of said transparent film is concave.

* * * * *